(12) United States Patent  (10) Patent No.: US 12,225,012 B2
She  (45) Date of Patent: Feb. 11, 2025

(54) SERVICE PROCESSING METHOD AND DEVICE

(71) Applicant: WANGSU SCIENCE & TECHNOLOGY CO., LTD., Shanghai (CN)

(72) Inventor: Jiangning She, Shanghai (CN)

(73) Assignee: WANGSU SCIENCE AND TECHNOLOGY CO., LTD., Shanghai (CN)

(*) Notice: Subject to any disclaimer, the term of this patent is extended or adjusted under 35 U.S.C. 154(b) by 167 days.

(21) Appl. No.: 18/194,616

(22) Filed: Mar. 31, 2023

(65) Prior Publication Data
US 2023/0254312 A1 Aug. 10, 2023

Related U.S. Application Data

(63) Continuation of application No. PCT/CN2021/130981, filed on Nov. 16, 2021.

(30) Foreign Application Priority Data

Jan. 28, 2021 (CN) .......................... 202110118441.1

(51) Int. Cl.
H04L 9/40 (2022.01)
(52) U.S. Cl.
CPC .................... H04L 63/10 (2013.01)
(58) Field of Classification Search
CPC ..... H04L 63/10; H04L 61/4511; H04L 67/02; H04L 67/1097; H04L 67/34;
(Continued)

(56) References Cited

U.S. PATENT DOCUMENTS 6,754,699 B2 6/2004 Swildens et al.
10,805,323 B1 10/2020 Varda
(Continued)

FOREIGN PATENT DOCUMENTS

CN 101984409 A 3/2011
CN 102999317 A 3/2013
(Continued)

OTHER PUBLICATIONS

Renjie Zheng, et al., "Practical Software Engineering", Tsinghua University Press, Apr. 30, 1997, P255-256, 3 pgs.
(Continued)

*Primary Examiner* — El Hadji M Sall
(74) *Attorney, Agent, or Firm* — USCH Law, PC

(57) ABSTRACT

The embodiments of the present disclosure relate to the technical field of content delivery network, and disclose a service processing method. The service processing method includes: receiving a customized service logic issued by a CDN user, receiving a user request corresponding to the customized service logic, loading the customized service logic and the user request to at least one execution process of a restricted namespace, where the restricted namespace is restricted to at least one of accessing CDN system files, calling key system interfaces, and using system resources, and processing and responding to the user request in the at least one execution process according to the customized service logic.

20 Claims, 4 Drawing Sheets

(58) Field of Classification Search
CPC ... H04L 67/568; H04L 67/63; H04L 67/1004; H04L 67/30; H04L 67/60; G06F 21/53; G06F 21/629; G06F 9/505
See application file for complete search history.

(56) References Cited

U.S. PATENT DOCUMENTS

| | | | |
|---|---|---|---|
| 10,805,652 B1 | 10/2020 | Uthaman et al. | |
| 2003/0135509 A1 | 7/2003 | Davis et al. | |
| 2008/0091767 A1* | 4/2008 | Afergan | H04L 63/02 709/202 |
| 2011/0295996 A1* | 12/2011 | Qiu | H04L 47/10 709/224 |
| 2012/0089700 A1 | 4/2012 | Safruti et al. | |
| 2012/0209942 A1* | 8/2012 | Zehavi | H04L 67/63 709/213 |
| 2014/0082126 A1 | 3/2014 | Kim et al. | |
| 2014/0108674 A1* | 4/2014 | Eggleston | H04L 61/5069 709/245 |
| 2014/0173067 A1* | 6/2014 | Newton | H04L 41/0823 709/221 |
| 2017/0126538 A1 | 5/2017 | Wistow | |
| 2017/0168783 A1 | 6/2017 | Liu | |
| 2019/0268393 A1* | 8/2019 | Panagos | H04L 65/70 |

FOREIGN PATENT DOCUMENTS

| | | |
|---|---|---|
| CN | 103036977 A | 4/2013 |
| CN | 103329113 A | 9/2013 |
| CN | 104123157 A | 10/2014 |
| CN | 105577714 A | 5/2016 |
| CN | 108028853 A | 5/2018 |
| CN | 109067890 A | 12/2018 |
| CN | 111737032 A | 10/2020 |
| CN | 112272190 A | 1/2021 |
| CN | 112988378 A | 6/2021 |
| WO | 2016180284 A1 | 11/2016 |

OTHER PUBLICATIONS

Zhonghua Deng, et al., "Information Systems Analysis and Design", Wuhan University Press, Jun. 30, 2011, P329, 2 pgs.
Maohua Wang, et al., "Spacecraft Electrical Test Technology", Beijing Institute of Technology Press, Mar. 31, 2018, P418, 2 pgs.
Lifa Wu, et al., "Network Protocol Reverse Analysis and Application", National Defense Industry Press, Jan. 31, 2016, P275, 2 pgs.
Wangsu Science & Technology Co., Ltd., Extended European Search Report, EP 21922462.3 , Jun. 3, 2024, 9 pgs.
Wangsu Science & Technology Co., Ltd., CN First Office Action with English translation, CN 2021101184411 , Apr. 23, 2024, 15 pgs.
Wangsu Science & Technology Co., Ltd., CN First Office Action with English translation, CN 2021101172467 , Dec. 22, 2023, 21 pgs.
Wangsu Science & Technology Co., Ltd., CN First Office Action with English translation, CN 2021101184426, Oct. 20, 2023 15 pgs.
Wangsu Science & Technology Co., Ltd., International Search Report with English translation, PCT/CN2021/130981, Jan. 17, 2022, 6 pgs.
Lin Zhang et al., "Network Organization, Management and Security", Posts & Telecommunications Press, Dec. 31, 2000, p. 530-533, 6 pgs.
N. Abramson et al., "Computer Communication Network", Posts & Telecommunications Press, Aug. 31, 1982, p. 60-61, 4 pgs.

* cited by examiner

SERVICE PROCESSING METHOD AND DEVICE

CROSS REFERENCE TO RELATED APPLICATIONS

This application is a continuation of PCT Patent Application No. PCT/CN2021/130981, entitled "SERVICE PROCESSING METHOD AND DEVICE," filed Nov. 16, 2021, which claims priority to Chinese Patent Application No. 202110118441.1 filed on Jan. 28, 2021, each of which is incorporated herein by reference in its entirety.

TECHNICAL FIELD

The various embodiments described in this document relate in general to the technical field of content delivery network, and more specifically to a service processing method and device.

BACKGROUND

Development and launch of an overall traditional content delivery network (CDN) customized service involves a long term and a large number of manpower before delivery. This does not meet development need of the Internet industry, as users have increasingly high requirements for timeliness and flexibility in service delivery. Therefore, programmable CDN, an open delivery method, occurs. After issued by a CDN user, service codes run on CDN.

Currently, in running, the service codes issued by the CDN user are directly loaded to a CDN node server process. However, because the service codes issued by the CDN user are third-party codes which may do many things beyond the authority of running the service during running of the CDN node server process, the method has a significant impact on safety of the CDN node.

SUMMARY

Embodiments of the present disclosure is intended to provide a service processing method and device that is able to reduce impact of a service logic issued by a CDN user on safety and performance of a CDN node, while superposing existing advantages of acceleration and caching of CDN.

In order to address the technical problem, the embodiments of the present disclosure provide a service processing method including: receiving a customized service logic issued by a CDN user, receiving a user request corresponding to the customized service logic, forwarding the customized service logic and the user request to an execution process of a restricted namespace, where the restricted namespace is restricted to accessing CDN system files, calling key system interfaces and using system resources, and processing and responding to the user request according to the customized service logic in the execution process.

The embodiments of the present disclosure further provide a service processing device including: a first receiving module configured to receive a customized service logic issued by a content delivery network CDN user, a second receiving module configured to receive a user request corresponding to the customized service logic, a forwarding module configured to forward the customized service logic and the user request to an execution process of a restricted namespace, where the restricted namespace is restricted to accessing CDN system files, calling key system interfaces and using system resources, and a processing module configured to process and respond to the user request according to the customized service logic in the execution process.

The embodiments of the present disclosure further provide a server including at least one processor, and a memory in communicative connection with the at least one processor. The memory at least stores an instruction executable by the at least one processor. The instruction is executed by the at least one processor to cause the at least one processor to perform the foregoing service processing method.

The embodiments of the present disclosure further provide a computer-readable storage medium storing a computer program that implements the foregoing service processing method when executed by a processor.

Compared with a related technology, the embodiments of the present disclosure include: receiving a customized service logic issued by a CDN user, receiving a user request corresponding to the customized service logic, forwarding the customized service logic and the user request to an execution process of a restricted namespace, and processing and responding to the user request according to the customized service logic running in the execution process. Because the customized service logic is run in the execution process of the restricted namespace, and the restricted namespace is restricted to accessing CDN system files and calling key system interfaces, the customized service logic run in the execution process of the restricted namespace cannot do things beyond authority of service and cannot go beyond restriction of the system to occupy system resources. Therefore, the impact of the customized service logic on safety and stability of a CDN node can be reduced. In addition, compared with a method of using a container, a process costs fewer resources. Therefore, by implementing the solution during the execution process, resources of the CDN node can be used more sufficiently.

Furthermore, the operation of forwarding the customized service logic and the user request to the execution process of the restricted namespace includes: forwarding the customized service logic and the user request to the execution process through a management process configured to manage the execution process in the restricted namespace, there being at least one execution process. Based on a user request, code and configuration files corresponding to the customized service logic are loaded to an execution process, and then the user request is forwarded to the execution process through the management process. Because the CDN node server process only has to forward a request related to customized service logic, it is not necessary to obtain and transmit the customized service logic, and it is not necessary to manage the execution process in the restricted namespace. Therefore, burden on the CDN node server process can be reduced and running efficiency of the CDN node server process can be improved.

Furthermore, the operation of receiving the user request corresponding to the customized service logic includes: a CDN node server process forwards the user request to a management process according to a filtering condition of the user request. Herein, the filtering condition of the user request includes at least one of a domain name of the user request, a customized request header and a customized uniform resource locator (URL) parameter. The CDN node server process interacts with the management process through inter-process communication. By forwarding qualified user request to the management process according to the filtering condition of the user request, the user request may be responded to by the customized service logic, thereby achieving customized function of CDN.

Furthermore, the operation of forwarding the customized service logic and the user request to the execution process of the restricted namespace includes: the management process calls the customized service logic based on the user request, and forwards the user request and the customized service logic to the execution process. By calling the customized service logic through the management process, the CDN node server process only has to forward the user request to the management process but does not have to call the customized service logic, thereby improving running efficiency of the CDN node server process.

Furthermore, the method further includes: forwarding the customized service logic to one of execution processes before receiving the user request. The operation of forwarding the customized service logic and the user request to the execution process of the restricted namespace includes: forwarding the user request to the execution process which the customized service logic resides in. Because the customized service logic runs before receiving the user request, the user request can be processed and responded to immediately after the user request is received. This improves speeds of processing and response to the user request.

Furthermore, the operation of forwarding the customized service logic to one of the execution processes through the management process before receiving the user request includes: forwarding a plurality of customized service logics to one of the execution processes through the management process before receiving the user request. The operation of processing and responding to the user request according to the customized service logic in the execution process includes: dynamically switching amongst different customized service logics according to different user requests, and processing and responding to the different user requests, in response to the user requests forwarded being more than one. That is, if there are synchronously different user requests forwarded to the execution process, a plurality of set of service codes, each corresponding to a respective customized service logic of the plurality of customized service logics, may synchronously be loaded to the execution process. The different sets of the service codes may dynamically be switched according to different user requests to reduce waiting time of the execution processes.

Furthermore, the management process is further configured to balance loads of execution processes in different CDN nodes. By adjusting the loads of the execution processes of different nodes through the management process, the execution processes of different nodes can achieve a load balance, thereby avoiding a service failure caused by excessive load on a single CDN node.

Furthermore, the CDN node server process, the management process, and the execution process are deployed in one CDN node or node cluster.

Furthermore, the method further includes: if an execution time of the user request in the execution process is greater than a preset time threshold, the execution process which the user request resides in is terminated. When the execution time of the user request is greater than the preset time threshold, the execution process which the customized service logic resides in is terminated. This can prevent a case where the corresponding execution process continuously occupies resources of the CDN node resulting in exclusive occupation of resource, in order to ensure normal running of the CDN node.

Furthermore, the method includes creating an execution process in response to receiving an updated customized service logic and the customized service logic before updating being in a running state. A created execution process is configured to execute the updated customized service logic. The execution process which the customized service logic before updating resides in is cancelled after the customized service logic before updating finishes running. That is, after all service codes are updated and issued to the CDN node, if an old service logic is in execution, a new execution process may be started to load new service codes. All lately received requests are processed by the new execution process. The old process is destroyed by itself after all existing requests are processed.

Furthermore, the execution process includes a dynamic resolver supporting dynamic interpretation of a script language.

Furthermore, the customized service logic includes an execution script and corresponding configuration files issued by the CDN user.

Furthermore, the method includes after the user request is processed and responded to, the execution process forwards the user request back to the CDN node server process. After the service processing is completed, the execution process may forward the request back to a CDN server process. This may superpose the acceleration and buffering function of CDN.

BRIEF DESCRIPTION OF THE DRAWINGS

One or more embodiments are described as examples with reference to the corresponding figures in the accompanying drawings, and the examples do not constitute a limitation to the embodiments.

DETAILED DESCRIPTION OF THE EMBODIMENTS

The embodiments of the present disclosure will be described in detail below with reference to the accompanying drawings in order to make the objectives, technical solutions and advantages of the present invention clearer. However, it will be apparent to those skilled in the art that, in the various embodiments of the present invention, numerous technical details are set forth in order to provide the reader with a better understanding of the present disclosure. However, the technical solutions claimed in the present disclosure can be implemented without these technical details and various changes and modifications based on the following embodiments.

A first embodiment of the present disclosure relates to a service processing method. The service processing method includes: receiving a customized service logic issued by a CDN user, receiving a user request corresponding to the customized service logic, forwarding the customized service logic and the user request to an execution process of a restricted namespace, and processing and responding to the user request according to the customized service logic in the execution process. Because the customized service logic runs during the execution process of the restricted namespace, and the restricted namespace is restricted to accessing CDN system files and calling key system interfaces, as well as maximum use of resources, the customized service logic cannot act beyond its authority of service. Therefore, the impact of the customized service logic on safety of a CDN node can be reduced. In addition, compared with a method of using a container, a process costs fewer resources. Therefore, by implementing the solution during the execution process, resources of the CDN node can be used more sufficiently while superposing existing advantages of acceleration and caching of CDN.

It shall be noted that an execution body of the service processing method in this embodiment includes, but not limited to, a CDN node. Herein, the CDN node may be implemented by a cluster formed by one CDN server or a plurality of CDN servers. Besides, the CDN node may be deployed in a non-CDN cluster.

Figure 1:
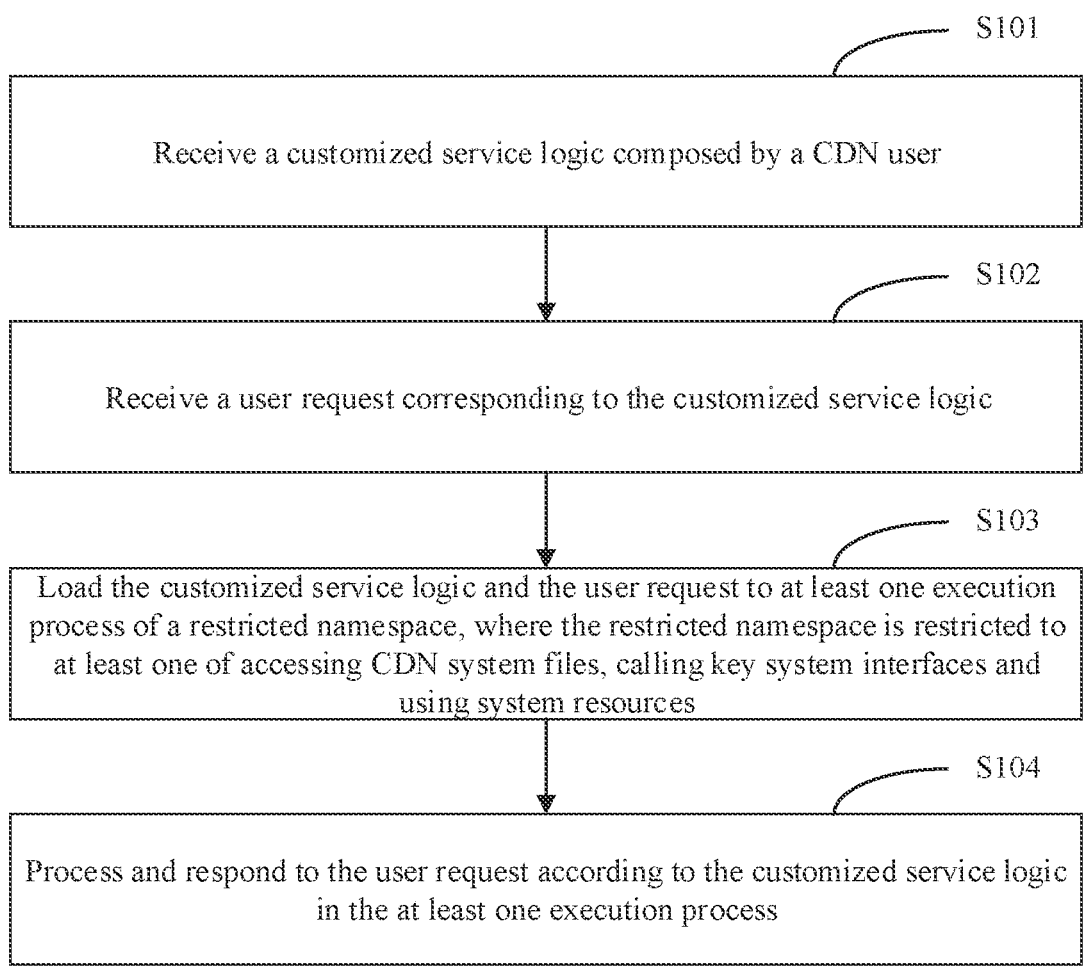
FIG. 1 is a flow chart of a service processing method provided in a first embodiment of the present disclosure.

An exemplary flow chart of the service processing method provided in this embodiment is shown as FIG. 1, including the following operations.

In S101, a customized service logic issued by a CDN user is received.

Herein, when the CDN user issues the customized service logic, the customized service logic may be composed through a service platform communicatively connected with the CDN node, and then a completed customized service logic may be transmitted to the CDN node. Before an issuing action of the CDN user, there may be an action of composing the customized service logic. To be specific, based on a preset script language of an on-line editing platform, the CDN user composes the customized service logic by himself, or a third party composes the customized service logic and submits the customized service logic to the CDN user, not a CDN service provider.

Alternatively, the customized service logic may include a code file and configuration information. Herein, the code file describes a processing logic of the service in codes, and the configuration information may include execution conditions or startup parameters of the code file. A code script composed by the user himself may run in the CDN node, supports dynamic loading and does not depend on system version update of the CDN node, so that the user can compose the service logic by himself.

After receiving the customized service logic issued by the CDN user, the CDN node may save it to a specified directory. Alternatively, the CDN node may store the configuration information together with the code file in the specified directory, or may store the configuration information in a directory for exclusive storage of configuration information.

Because the customized service logic runs in the restricted namespace and is isolated from a CDN node server process, there are no specific restrictions on a language used for the customized service logic. The language may be a script language or another high-level programming language. Correspondingly, there may be multiple file forms of the customized service logic.

In S102, a user request corresponding to the customized service logic is received.

Herein, the user request may be a request corresponding to the customized service logic, specifically, a request for application layer protocol, like an http or https request.

When determining whether the request corresponds to the customized service logic, the CDN node may perform a determination based on execution conditions of the customized service logic. Specifically, the determination may be performed based on a domain name of the request and/or preset trigger conditions. When the request matches the customized service logic with respect to the domain name and/or the preset trigger conditions, it is determined that a user request corresponding to the customized service logic is received. Specific execution conditions may be set as desired by the CDN user in the customized service logic, which is not specifically limited herein.

For example, if the customized service logic is a customized service logic for a request for a domain name A, the CDN node may determine that the request is a user request corresponding to the customized service logic when a request for a domain name of "www.A.com" is received. For another example, if the customized service logic is a customized service logic for a request for the domain name A and with the requested IP address being an IP address in the Shanghai region, when a request for a domain name of "www.A.com" and with the requested IP address being in the Shanghai region is received, the CDN node may determine that the request is a user request corresponding to the customized service logic.

In S103, the customized service logic and the user request are forwarded to an execution process of a restricted namespace. Herein, the restricted namespace is restricted to accessing CDN system files, calling key system interfaces, and using system resources.

Herein, accessing the CDN system files includes reading and writing system files of the CDN node. The key system interfaces include a system application programming interfaces (API) impacting running of a CDN node server process. For example, stopping a server process and disconnecting network connection may affect the system APIs where the CDN node server process is running. Because the restricted namespace is restricted to accessing the CDN system files, calling the key system interfaces and using system resources, and the execution process runs in the restricted namespace, correspondingly, the execution process is restricted to accessing the CDN system files, calling the key system interfaces and cannot go beyond restriction of the system to take system resources.

Alternatively, the CDN node may forward the customized service logic and the user request to the execution process of the restricted namespace through the CDN node server process.

In S104, the user request is processed and responded to according to the customized service logic in the execution process.

Alternatively, after the user request is processed through the customized service logic during the execution process, the execution process returns a processing result to the CDN node server process. The CDN node server process responds to the user request. It shall be understood that the user here generally refers to an individual user, while a CDN user generally refers to an enterprise user. Since the execution process does not access content of the CDN system files, the processing result of the execution process is returned to the CDN node server process. The CDN node server process responds based on the processing result. This may ensure security of the CDN node server process while achieving a corresponding customized service of the CDN user.

Alternatively, when processing the user request, the customized service logic may run directly through the execution process or may run through a thread created by the execution process. It can be understood that by loading and running the customized service logic through the thread of the execution process, a plurality of customized service logics may be placed into a thread in one process (for example, to use each customized service logic as one code segment in the thread) to run. Therefore, a number of processes in the restricted namespace can be reduced. Further, memory occupied by the restricted namespace can be reduced.

Alternatively, the execution process is a dynamic resolver supporting dynamic interpretation of the high-level programming language. Specifically, the CDN node may compile the code file of the customized service logic in real time through the execution process. After obtaining an executable code that can run on the CDN node, the executable code may be run to process the user request.

Alternatively, the customized service logic includes an execution script and a corresponding configuration file issued by the CDN user. That is, the code file of the customized service logic is in a script form.

It is worth mentioning that when running the customized service logic, the customized service logic may further be placed in a container to run, in addition to a traditional method of loading the customized service logic to the CDN node server process. Because of the container's virtualized architecture, the customized service logic can well be isolated from other service processes on the CDN server, safety of the CDN node can well be ensured. However, the container occupies more resources in a CDN server. Using the container to run the customized service logic can increase performance overhead of the CDN node. In the service processing method provided in this embodiment, however, the customized service logic is placed in the execution process of the restricted namespace, which can also ensure safety of the CDN node. Besides, because the process takes less resources, the service processing method provided in this embodiment can improve processing efficiency of a central processing unit (CPU), compared with the container method. Therefore, overall service performance of the CDN node can be improved.

The service processing method provided in this embodiment includes: receiving a customized service logic issued by a CDN user, receiving a user request corresponding to the customized service logic, forwarding the customized service logic and the user request to an execution process of a restricted namespace, and processing and responding to the user request according to the customized service logic running in the execution process. Because the customized service logic runs in the execution process of the restricted namespace, and the restricted namespace is restricted to accessing CDN system files and calling key system interfaces, the customized service logic running in the execution process of the restricted namespace cannot act beyond its authority of service. Therefore, the impact of the customized service logic on safety and stability of a CDN node can be reduced. In addition, compared with a method of using a container, a process costs fewer resources. Therefore, by implementing the solution during the execution process, the overall service performance of the CDN node can be improved.

A second embodiment of the present disclosure relates to a service processing method. In this embodiment, a user request is forwarded to the execution process of the restricted namespace through a management process. The management process and the execution process may be understood as processes in an edge application in a CDN node. The edge application is a running environment independent of the CDN node server process. The edge application is isolated from the CDN node server process in terms of resources, and processes do not affect each other. The edge application and the CDN node server process may be deployed on one machine or independently from each other. A request data is transferred from the CDN node server process to the edge application for processing. For example, the edge application runtime console starts a monitoring service to receive a request for a triggering event. When a triggering event, for example, a user request, forwarded by the CDN node server process is received, code and configuration files are loaded according to the user request, the edge application service code is started to run, and the edge application runtime console compiles and executes the customized service logic corresponding to the user request in real time. A processing result is returned to the CDN node server process to complete subsequent processes, in order to multiplex an existing advantage of acceleration and caching of CDN. In addition, the edge application may adopt an on-demand startup mode instead of a non-resident mode to improve resource utilization. The edge application runs in a restricted namespace, for example, runs in a sandbox environment that may restrict resources used by processes, for example, CPU, memory and so on. A running environment of an edge application includes, but is not limited to, a sandbox. The running environment may alternatively be a container or a virtual machine.

Figure 2:
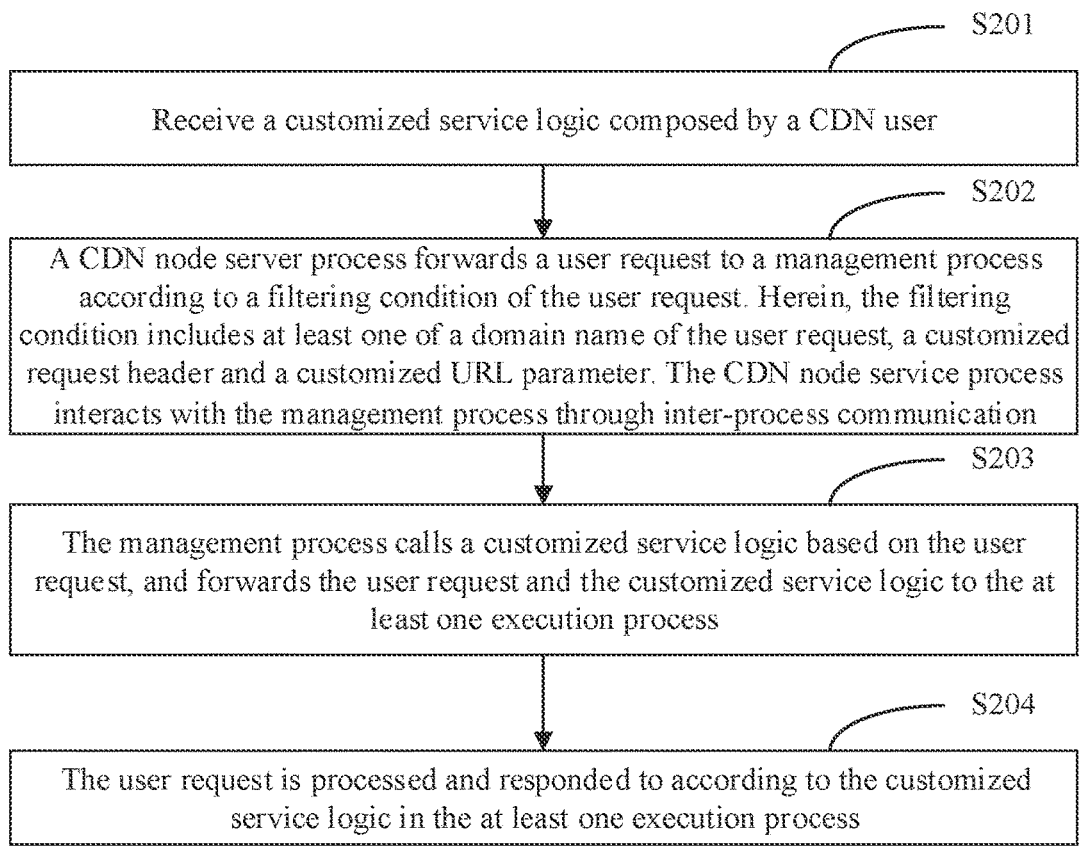
FIG. 2 is a flow chart of a service processing method provided in a second embodiment of the present disclosure.

An exemplary flow chart of the service processing method provided in this embodiment is shown as FIG. 2, including the following operations.

In S201, a customized service logic issued by a CDN user is received.

Herein, S201 is the same as S101 in the first embodiment. The first embodiment may be referred to for specific related description which is not repeated here to avoid duplication.

In S202, a CDN node server process forwards the user request to a management process of an edge application according to a filtering condition of the user request. Herein, the filtering condition includes a domain name of the user request, a customized request header or a customized URL parameter. The CDN node server process interacts with the management process through inter-process communication.

Alternatively, the CDN node server process may perform determination based on at least one of the domain name of the user request, the customized request header and the customized URL parameter, and a domain name of a service logic and/or a trigger condition, and forward qualified user requests to the management process.

Alternatively, the CDN node server process, the management process, and the execution process are deployed in a same CDN node or node cluster.

Alternatively, the management process is configured to manage the execution process in the restricted namespace. There may be one or more execution processes. When there are a plurality of execution processes, the management process forwards the user request and the customized service logic to one of the plurality of execution processes. Forwarding the customized service logic to the execution process refers to forwarding a file of the customized service logic to the execution process.

Alternatively, if there is no execution process, an execution process is started to load code and configuration files. The management process selects an execution process to load code and the configuration files based on the user request, and forwards the request to the execution process selected to process the service logic.

The management process may increase or reduce the number of execution processes. When increasing or reducing the number of the execution processes, the number may be increased when a load of existing execution processes reaches a first preset threshold, and the number may be reduced when a load of a certain execution process is lower than a second preset threshold. For example, if loads of all execution processes in the restricted namespace reach the first preset threshold (for example, 80%), a new execution process is added. If a load of a certain execution process in the restricted namespace falls below the second preset threshold (for example, 10%), the certain execution process is terminated.

Alternatively, an execution process is created in response to receiving an updated customized service logic and the customized service logic before updating being in a running state. A created execution process is configured to execute the updated customized service logic. The execution process which the customized service logic before updating resides in is cancelled after the customized service logic before updating finishes running. That is, if the updated customized service logic is received during running of an old customized service logic, the management process may add a new execution process, load a new set of service code, and forward a received new request for the service to the new execution process for processing. The old execution process continues to process the received request until all requests are processed and the old process is destroyed by itself.

Alternatively, the management process is further configured to balance loads of execution processes in different CDN nodes. That is, if the execution process in the restricted namespace of a current CDN node reaches a second preset load, and the user request is a request newly received by the current CDN node, the user request is forwarded to an execution process in the restricted namespace of another CDN node, such that the execution process of another CDN node runs the customized service logic to process the user request. Herein, the second preset load may be set as practically desired, for example, 80%, 85%, or 90%. The value of the second preset load may be the same as or different from the value of the first preset load. By adjusting the loads of the execution processes of different nodes through the management process, the execution processes of different nodes may achieve a load balance, thereby avoiding a service failure caused by excessive load on a single CDN node. In practice, an existing load balancing technology of CDN may be used to achieve that the processes on each node are at a reasonable level. For example, if an execution process of a node is relatively idle, a load balancing function of the CDN may be used to forward the request to the node for processing.

By forwarding qualified user requests to the management process through filtering conditions of the user requests, the user requests may be responded to by the customized service logic, thereby achieving customized function of CDN.

In S203, the management process of the edge application calls the customized service logic based on the user request, and forwards the user request and the customized service logic to the execution process of the edge application.

Herein, the management process runs outside the restricted namespace. Upon receiving the user request, the management process calls a corresponding customized service logic at a specified position in the CDN node based on the user request, and then forwards a called customized service logic and the user request to the execution process in the restricted namespace.

By calling the corresponding customized service logic through the management process, the CDN node server process only has to forward the user request to the management process but does not have to call the customized service logic, thereby improving running efficiency of the CDN node server process.

In S204, the user request is processed and responded to according to the customized service logic in the execution process.

Herein, S204 is the same as S104 in the first embodiment. The first embodiment may be referred to for specific related description which is not repeated here to avoid duplication.

Alternatively, if a response to the user request is not null, a response content corresponding to the user request and the customized service logic are forwarded to the execution process through the management process. For example, if the user request hits a cache file at the CDN node, the CDN node forwards a hit cache file and the customized service logic to the execution process through the management process, such that the execution process correspondingly processes the cache file to achieve a corresponding customized service logic. Because the restricted namespace does not have right to accessing CDN system files, the response content corresponding to the user request and the customized service logic are forwarded together to the execution process in the restricted namespace. In this way, the execution process may correspondingly process the response content to achieve the corresponding customized service logic.

Alternatively, if the CDN node fails to hit a cache and has to perform a back-to-source process, the CDN node server process performs the back-to-source process. By performing the back-to-source process through the CDN node server process rather than through a cache process of the CDN node, the cache process may not be coupled to a service, thereby improving running efficiency of the cache process.

Alternatively, if an execution time of the user request in the execution process is greater than a preset time threshold, the execution process which the user request resides in is terminated. Herein, the preset time threshold may be set as practically desired, and is not specifically limited. When the execution time of the user request is greater than the preset time threshold, the execution process which the customized service logic resides in is terminated. This may prevent a case where the corresponding execution process continuously occupies resources of the CDN node resulting in exclusive occupation of resource, in order to ensure normal running of the CDN node.

Figure 3:
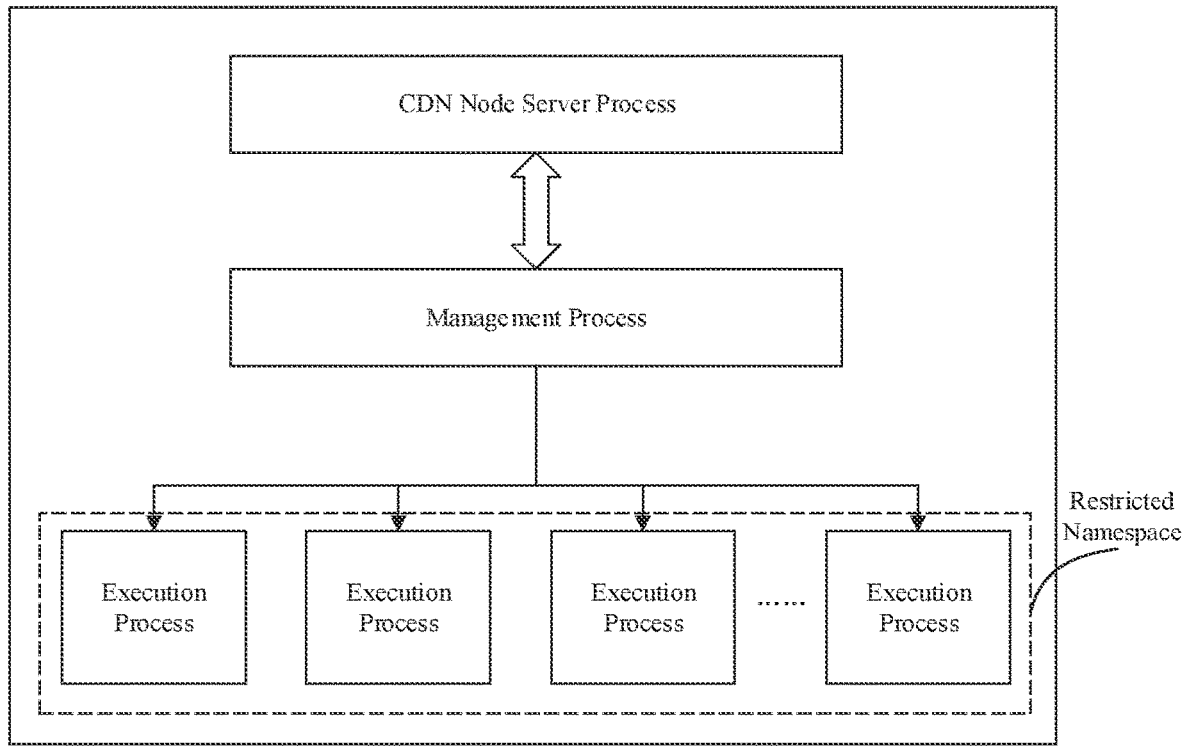
FIG. 3 is a block diagram showing principle of the service processing method provided in the second embodiment of the present disclosure.

FIG. 3 is a block diagram showing principle of the service processing method provided in the second embodiment of the present disclosure. Specifically, the CDN node server process interacts with the management process through inter-process communication. The management process is located outside the restricted namespace. Upon receiving a request, the CDN node server process forwards a qualified user request to the management process. Then the management process forwards the user request and the service logic to the execution process in the restricted namespace to process the user request. The execution process returns a result of processing of the user request to the management process. The management process then returns the processing result to the CDN node server process. The CDN node server process responds to the user request.

Figure 4:
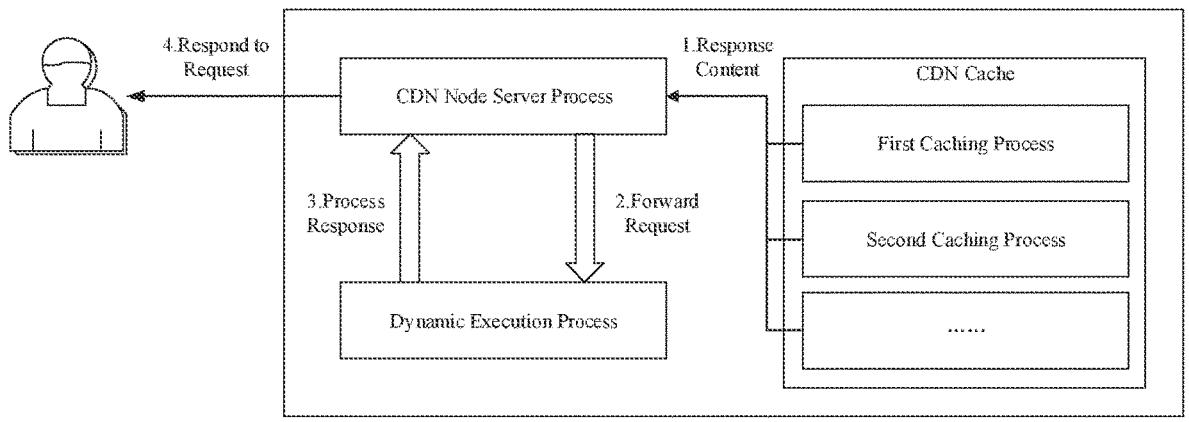
FIG. 4 is an exemplary diagram of the service processing method provided in the second embodiment of the present disclosure.

FIG. 4 is an exemplary diagram of the service processing method provided in the second embodiment of the present disclosure. In FIG. 4, a dynamic execution process includes a management process and an execution process (not shown in the figure). Specific description with reference to FIG. 4 is as follows. 1. The user request hits a cache at the CDN node. 2. A CDN node server process forwards a response content corresponding to the user request to the management process of the dynamic execution process, the management process forwards a response request, the customized service logic and the response content to the execution process for processing, and then the execution process returns a processing result to the management process after the processing. 3. The management process returns the processing result to the CDN node server process. 4. The CDN node server process responds to the user with the processing result. It shall be noted that FIG. 4 takes an execution phase of a request response after the cache is hit as an example for description. Practically, operations in another execution phase is similar to the operations in FIG. 4. The operations in FIG. 4 may be referred to and is not described in detail.

It shall be understood that in this embodiment, running of the customized service logic comes after receiving the user request. That is, the customized service logic runs to process the user request after the user request is received. This causes a certain response time delay. However, because there generally is some computation for the customized service logic, the response time delay resulted from running of the customized service logic after receiving the request may basically be ignored, compared with time needed for computation of the customized service logic.

In the service processing method provided in this embodiment, the user request is firstly forwarded to the management process managing the execution process in the restricted namespace, and then the management process forwards the user request and the customized service logic to the execution process. The CDN node server process only has to forward a request related to customized service logic, it is not necessary to obtain and transmit a corresponding customized service logic, and it is not necessary to manage the execution process in the restricted namespace. Therefore, burden on the CDN node server process can be reduced and running efficiency of the CDN node server process can be improved.

A third embodiment of the present disclosure relates to a service processing method. In this embodiment, before receiving the user request, the management process starts a monitoring service to wait for receiving the user request. After the user request is received, an execution process is started or corresponding service codes and configuration are loaded to an existing execution process according to the user request. Then the user request is forwarded to the execution process which the customized service logic resides in.

Figure 5:
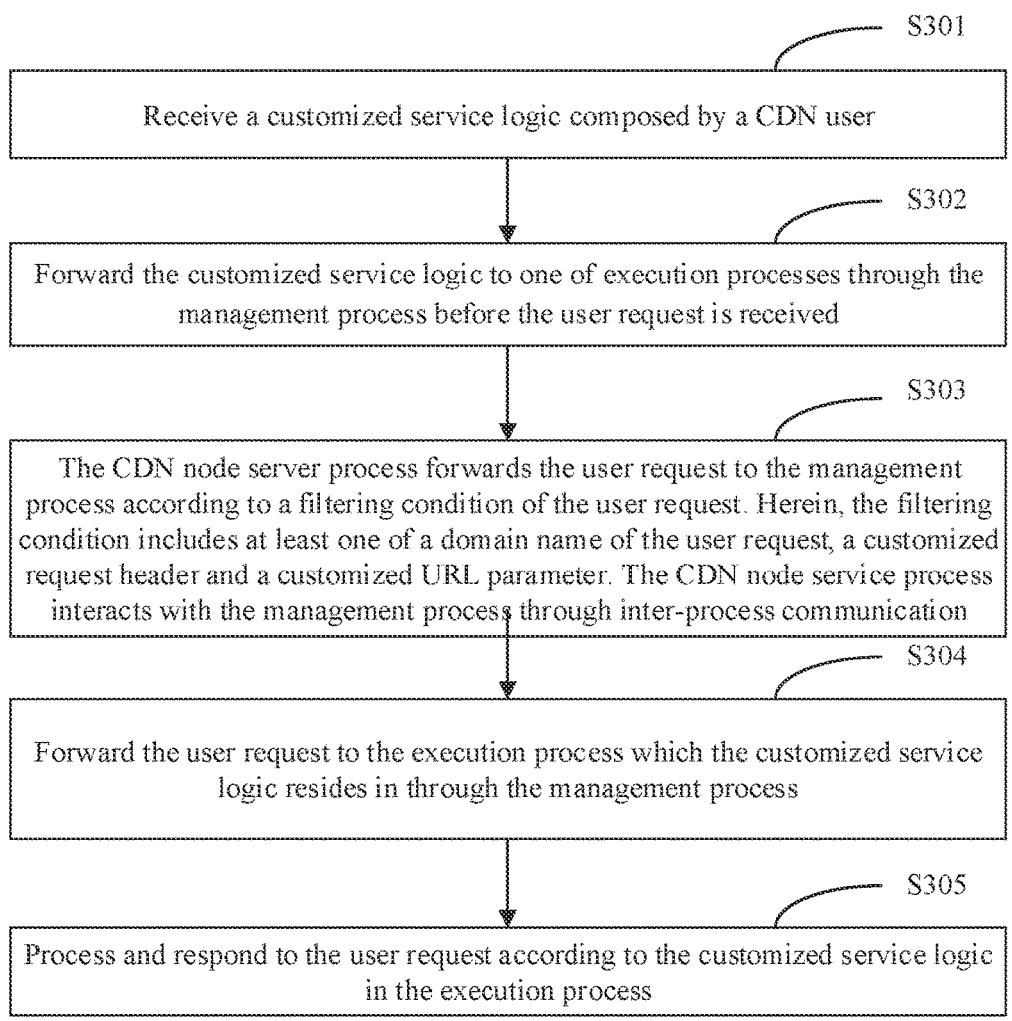
FIG. 5 is a flow chart of a service processing method provided in a third embodiment of the present disclosure.

An exemplary flow chart of the service processing method provided in this embodiment is shown as FIG. 5, including the following operations.

In S301, a customized service logic issued by a CDN user is received.

Herein, S301 is the same as S101 in the first embodiment. The first embodiment may be referred to for specific related description which is not repeated here to avoid duplication.

In S302, before the user request is received, the customized service logic is forwarded to one of execution processes through the management process.

That is, before receiving the user request, the CDN node forwards in advance the customized service logic to one of the execution processes through the management process.

In S303, the CDN node server process forwards the user request to the management process according to a filtering condition of the user request. Herein, the filtering condition includes a domain name of the user request, a customized request header or a customized URL parameter. The CDN node server process interacts with the management process through inter-process communication.

Herein, S303 is the same as S202 in the second embodiment. The second embodiment may be referred to for specific related description which is not repeated here to avoid duplication.

In S304, the user request is forwarded to the execution process which the customized service logic resides in through the management process.

Because there are a plurality of execution processes, and the management process is responsible for managing the plurality of execution processes and running the customized service logic in one of the plurality of execution processes upon receiving the user request, the management process may forward the user request to the execution process which the customized service logic resides in after receiving the user request.

In one example, before receiving the user request, a plurality of customized service logics may be forwarded to one of the plurality of execution processes through the execution processes. In a case where there are more than one user requests that are forwarded, different customized service logics may be dynamically switched according to different user requests to process and respond to the user requests. That is, if there are synchronously different user requests forwarded to the execution process, a plurality of service codes may synchronously be loaded to the execution process. The different service codes may dynamically be switched according to different user requests to reduce waiting time of the execution processes.

In one example, for a user request received first, the corresponding service codes and related configuration are loaded into an execution process according to the user request, and then the user request is forwarded to a corresponding execution process. If the corresponding service codes are loaded to the execution process, the execution process is switched to the corresponding service codes first and then a received service request is processed.

In S305, the user request is processed and responded to according to the customized service logic in the execution process.

Herein, S305 is the same as S204 in the second embodiment. The second embodiment may be referred to for specific related description which is not repeated here to avoid duplication.

In this embodiment, execution of a customized service logic is triggered by starting a monitoring service to receive a user request forwarded by the CDN node server process. In another example, the execution may be voluntarily started by setting a regular task. For example, by issuing a start time and related service codes and configuration file information through a triggering event, the edge application may execute a related customized service logic regularly, for example, to collect and report CDN logs regularly.

In the service processing method provided in this embodiment, before receiving the user request, the customized service logic is forwarded to one of the execution processes through the management process. After receiving the user request, the user request is forwarded to the execution process which the customized service logic resides in through the management process. Because the customized service logic runs before receiving the user request, the user request may be processed and responded to immediately after the user request is received. This improves speeds of processing and response to the user request.

The steps provided in the above methods aim for clear description. In implementation, the steps may be combined into one step or some step may be divided into a plurality of steps, which fall into the protection scope of the present disclosure as long as a combination or division involves the same logical relationship as the present disclosure. Unimportant amendment to an algorithm or a flow or introduction of an unimportant design that does not change the nuclear design of the algorithm or a flow falls into the protection scope of the present disclosure.

Figure 6:
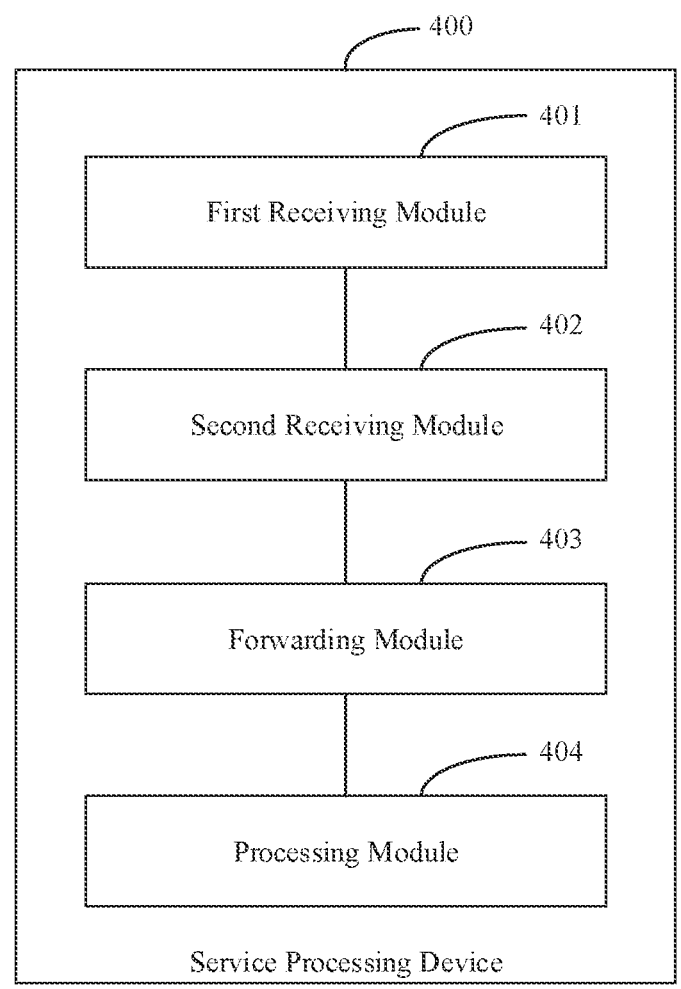
FIG. 6 is a module structure diagram of a service processing device provided in a fourth embodiment of the present disclosure.

A fourth embodiment of the present disclosure relates to a service processing device 400. As shown in FIG. 6, the service processing device 400 includes a first receiving module 401, a second receiving module 402, a forwarding module 403 and a processing module. Functions of these modules are described in detail as follows.

The first receiving module 401 is configured to receive a customized service logic issued by a CDN user.

The second receiving module 402 is configured to receive a user request corresponding to the customized service logic.

The forwarding module 403 is configured to forward the customized service logic and the user request to an execution process of a restricted namespace. Herein, the restricted namespace is restricted to accessing CDN system files, calling key system interfaces, and using system resources.

The processing module 404 is configured to process and respond to the user request according to the customized service logic in the execution process.

Furthermore, the forwarding module 403 is configured to:

forward the customized service logic and the user request to the execution process through a management process for managing the execution process in the restricted namespace. There is at least one execution process.

Furthermore, the second receiving module 402 is configured that a CDN node server process forwards the user request to the management process according to a filtering condition of the user request. Herein, the filtering condition includes at least one of a domain name of the user request, a customized request header and a customized URL parameter. The CDN node server process interacts with the management process through inter-process communication.

Furthermore, the forwarding module 403 is configured that the management process calls the customized service logic based on the user request, and forwards the user request and the customized service logic to the execution process.

Furthermore, the service processing device 400 provided in this embodiment further includes a pre-running module configured to:

forward the customized service logic to one of the execution processes through the management process before receiving the user request.

Furthermore, the forwarding module 403 is configured to forward the user request to the execution process which the customized service logic resides in through the management process.

In an example, the pre-running module is specifically configured to forward a plurality of customized service logics to one of the execution processes through the management process before receiving the user request. The processing module 404 is specifically configured to dynamically switch amongst different customized service logics according to different user requests, and to process and respond to the different user requests, in response to there being more than one user request forwarded.

Furthermore, the management process is further configured to balance loads of execution processes in different CDN nodes.

Furthermore, the CDN node server process, the management process, and the execution process are deployed in a same CDN node or node cluster.

Furthermore, the service processing device 400 provided in this embodiment further includes a timeout module configured to:

terminate an execution process which the user request resides in when an execution time of the user request in the execution process is greater than a preset time threshold.

Furthermore, the execution process is a dynamic resolver supporting dynamic interpretation of a high-level programming language.

Furthermore, the customized service logic includes an execution script and a corresponding configuration file issued by the CDN user.

Furthermore, the forwarding module is further configured to, after an updated customized service logic is received, forward the user request to a lately created execution process in a case where the customized service logic before updating is currently in a running state. The lately created execution process is configured to execute the updated customized service logic. The execution process which the customized service logic before updating resides in is cancelled after the customized service logic before updating finishes running. It is determined whether a current execution process includes a phase of old-new service transition. If there is the phase of old-new service transition, all requests newly received are forwarded to an execution process including new service codes, so as to ensure an old service logic is smoothly transited to a new service logic.

It is not difficult to find that this embodiment is a device embodiment corresponding to the foregoing embodiments. This embodiment may be implemented in coordination with the foregoing embodiments. Related technical details involved in the foregoing embodiments are valid in this embodiment, which are not repeated here to avoid duplication. Correspondingly, related technical details involved in this embodiment are valid in the foregoing embodiments.

It is worth noted that the modules involved in this embodiment are logic modules. In practical application, a logic unit may be a physical unit or a part of a physical unit or a combination of a plurality of physical units. Besides, in order to highlight inventive portions in the present disclosure, units that are not closely related to the technical problems indicated in the present disclosure are not introduced to this embodiment, which does not mean that this embodiment does not include the other units.

Figure 7:
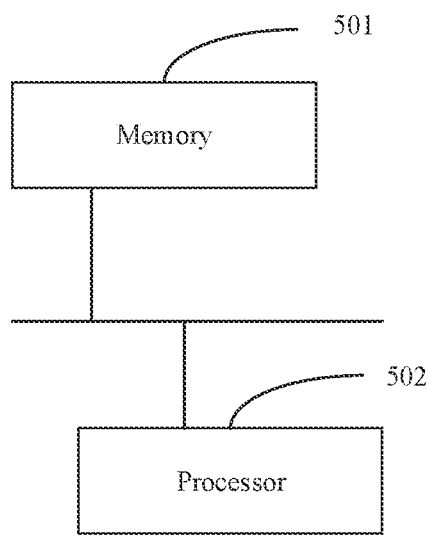
FIG. 7 is a structural diagram of a server provided in a fifth embodiment of the present disclosure.

A fifth embodiment of the present disclosure relates to a server. As shown in FIG. 7, the server includes at least one processor 501 and a memory 502 in communicative connection with the at least one processor 501. Herein, the memory 502 at least stores an instruction executable by the at least one processor 501. The instruction is executed by the at least one processor 501 to cause the at least one processor 501 to implement the service processing method as described above.

Herein, the memory 502 and the at least one processor 501 are connected in a bus manner. The bus may include any number of interconnected bus and bridge. The bus connects one or a plurality of processors 501 with multiple circuits of the memory 502. The bus may further connect multiple other circuits such as a peripheral device, a voltage regulator and a power management circuit. These are common knowledge in the existing technology. Therefore, these are not further described. A bus interface provides an interface between the bus and a transceiver. The transceiver is one or more elements, for example, a plurality of receivers and transmitters, providing units for communicating with other devices on a transmission media. Data processed by the at least one processor 501 is transmitted on a wireless medium through an antenna. Furthermore, the antenna receives the data from the at least one processor 501 and transmits the data to the at least one processor 501.

The at least one processor 501 is responsible for managing the bus and general processing, and may provide multiple functions including timing, peripheral interface, voltage regulation, power management and other control functions. The memory 502 may be configured to store data used by the at least one processor 501 when executing an operation.

A sixth embodiment of the present disclosure relates to a computer-readable storage medium, storing a computer program that implements the foregoing method embodiments when executed by a processor.

That is, those skilled in the art may understand that all or some steps of the method in the foregoing embodiments may be implemented through a program instructing related hardware. The program is stored in a storage medium, including a number of instructions for enabling one device (which may be a single-chip microcomputer, a chip or the like) or a processor to execute some or all steps of the method in the embodiments of the present disclosure. The foregoing storage medium includes multiple media capable of storing program codes, for example, a universal serial bus disk, a mobile hard disc, a read-only memory (ROM), a random access memory (RAM), a magnetic disc, an optical disc, or the like.

Those skilled in the art should appreciate that the aforementioned embodiments are specific embodiments for implementing the present invention. In practice, however, many changes can be made in the forms and details of the specific embodiments without departing from the spirit and scope of the invention.

What is claimed is:

1. A service processing method, comprising:
   receiving a customized service logic issued by a user of a content delivery network (CDN);
   receiving a user request corresponding to the customized service logic;
   loading the customized service logic and the user request to at least one execution process of a restricted namespace, wherein the restricted namespace is restricted to at least one of accessing CDN system files, calling key system interfaces, and using system resources; and
   processing and responding to the user request according to the customized service logic in the at least one execution process.

2. The service processing method according to claim 1, wherein the operation of loading the customized service logic and the user request to the at least one execution process of the restricted namespace comprises:
   loading code and configuration files corresponding to the customized service logic to the at least one execution process;
   forwarding the user request to the at least one execution process through a management process for managing the at least one execution process in the restricted namespace.

3. The service processing method according to claim 1, wherein the operation of receiving the user request corresponding to the customized service logic comprises:
   a CDN node server process forwarding the user request to a management process of an edge application according to a filtering condition of the user request, the filtering condition comprising at least one of a domain name of the user request, a customized request header and a customized uniform resource locator (URL) parameter, and the CDN node server process interacting with the management process through inter-process communication;
   the operation of loading the customized service logic and the user request to the at least one execution process of the restricted namespace comprises:
   forwarding qualified user requests to the management process through the filtering condition of the user request.

4. The service processing method according to claim 1, wherein the operation of loading the customized service logic and the user request to the at least one execution process of the restricted namespace comprises:
   a management process of an edge application calling the customized service logic based on the user request, and forwarding the user request and the customized service logic to the at least one execution process.

5. The service processing method according to claim 1, further comprising:
   forwarding the customized service logic to one of the at least one execution process through a management process before receiving the user request; and
   the operation of loading the customized service logic and the user request to the at least one execution process of the restricted namespace comprising:
   forwarding the user request to an execution process which the customized service logic resides in through the management process.

6. The service processing method according to claim 5, the operation of forwarding the customized service logic to one of the at least one execution process through the management process before receiving the user request comprising:
   forwarding a plurality of customized service logics to one of the at least one execution process through the management process before receiving the user request; and
   the operation of processing and responding to the user request according to the customized service logic in the at least one execution process comprising:
   in response to there being more than one user request forwarded,
   dynamically switching amongst different customized service logics according to different user requests, and
   processing and responding to the different user requests.

7. The service processing method according to claim 2, wherein the management process is further configured to adjust loads of different execution processes in a CDN node.

8. The service processing method according to claim 3, wherein the CDN node server process, the management process, and the at least one execution process are deployed in a same CDN node or node cluster.

9. The service processing method according to claim 1, further comprising:

terminating an execution process which a user request, an execution time of the user request in the execution process being greater than a preset time threshold, resides in.

10. The service processing method according to claim 1, further comprising:
creating an execution process in response to receiving an updated customized service logic and a customized service logic before updating being in a running state; wherein a created execution process is configured to execute the updated customized service logic; an execution process which the customized service logic before updating resides in is cancelled after the customized service logic before updating finishes running.

11. The service processing method according to claim 1, wherein each of the at least one execution process is a dynamic resolver supporting dynamic interpretation of a high-level programming language.

12. The service processing method according to claim 3, wherein the CDN node server process performs a back-to-source process in response to the CDN node not hitting a cache.

13. The service processing method according to claim 3, further comprising:
the at least one execution process forwarding the user request back to the CDN node server process after processing and responding to the user request according to the customized service logic in the at least one execution process.

14. The service processing method according to claim 1, wherein the customized service logic comprises code and configuration files issued by the CDN user.

15. The service processing method according to claim 3, wherein the management process starts a monitoring service to wait for receiving the user request, and execution of the customized service logic is triggered by starting the monitoring service to receive a user request forwarded by the CDN node server process.

16. The service processing method according to claim 1, wherein execution of the customized service logic is voluntarily started by setting a regular task.

17. The service processing method according to claim 3, wherein the edge application runs in the restricted namespace.

18. The service processing method according to claim 3, wherein the edge application runs in any one of a sandbox environment, a container and a virtual machine.

19. A service processing device, comprising:
at least one processor, and
a memory in communicative connection with the at least one processor;
wherein the memory at least stores an instruction executable by the at least one processor, and the instruction is executed by the at least one processor to cause the at least one processor to perform a service processing method;
wherein the service processing method includes:
receiving a customized service logic issued by a user of a content delivery network (CDN);
receiving a user request corresponding to the customized service logic;
loading the customized service logic and the user request to at least one execution process of a restricted namespace, wherein the restricted namespace is restricted to at least one of accessing CDN system files, calling key system interfaces, and using system resources; and
processing and responding to the user request according to the customized service logic in the at least one execution process.

20. A non-transitory computer-readable storage medium, storing a computer program that implements a service processing method when executed by a processor;
wherein the service processing method includes:
receiving a customized service logic issued by a user of a content delivery network (CDN);
receiving a user request corresponding to the customized service logic;
loading the customized service logic and the user request to at least one execution process of a restricted namespace, wherein the restricted namespace is restricted to at least one of accessing CDN system files, calling key system interfaces, and using system resources; and
processing and responding to the user request according to the customized service logic in the at least one execution process.

* * * * *